(12) United States Patent
Destraves et al.

(10) Patent No.: US 12,549,217 B2
(45) Date of Patent: Feb. 10, 2026

(54) RADIOFREQUENCY READING SYSTEM ON BOARD A MEANS OF TRANSPORT

(71) Applicant: COMPAGNIE GENERALE DES ETABLISSEMENTS MICHELIN, Clermont-Ferrand (FR)

(72) Inventors: Julien Destraves, Clermont-Ferrand (FR); Laurent Couturier, Clermont-Ferrand (FR); Pierre Guinault, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 152 days.

(21) Appl. No.: 18/293,150

(22) PCT Filed: Jul. 25, 2022

(86) PCT No.: PCT/FR2022/051481
§ 371 (c)(1),
(2) Date: Jan. 29, 2024

(87) PCT Pub. No.: WO2023/007079
PCT Pub. Date: Feb. 2, 2023

(65) Prior Publication Data
US 2024/0348282 A1  Oct. 17, 2024

(30) Foreign Application Priority Data

Jul. 30, 2021 (FR) .................................... 2108303

(51) Int. Cl.
*H04B 1/59* (2006.01)
(52) U.S. Cl.
CPC .................................... *H04B 1/59* (2013.01)

(58) Field of Classification Search
CPC ........................................................ H04B 1/59
(Continued)

(56) References Cited

U.S. PATENT DOCUMENTS 6,194,999 B1 * 2/2001 Uhl ..................... B60C 23/0437
340/447
6,304,172 B1 * 10/2001 Katou ................ B60C 23/0433
340/447

(Continued)

FOREIGN PATENT DOCUMENTS

| DE | 19518806 A1 | 11/1996 |
| EP | 1004461 A2 | 5/2000 |
| WO | 2007/127220 A2 | 11/2007 |

OTHER PUBLICATIONS

U.S. Appl. No. 19/120,321, filed Oct. 12, 2023 (available on Patent Center).

(Continued)

*Primary Examiner* — Kerri L Mcnally
(74) *Attorney, Agent, or Firm* — VENABLE LLP

(57) ABSTRACT

Transport means (2) equipped with a movable assembly (1) comprises a first part (12) set in motion about an axis of rotation (102) by a second assembly (11), the movable assembly (1) being equipped with a radiofrequency transponder (100) and a reading system (3) comprising: a generator coupled to a demodulator (31) of electrical signals; and a cable (32) galvanically connected to the generator (31), fixed to the transport means (2) and comprising a radiating part (342). The projection P onto a plane of the first part (12) located between two contiguous axes of rotation (11a, 11b) and/or the projection R onto a cylinder (104), of axis of revolution (102), circumscribing the first part (12) in contact with the second assembly (11) of the radiating part, is less than 1 meter.

14 Claims, 4 Drawing Sheets

(58) Field of Classification Search
USPC .................................................. 340/572.2
See application file for complete search history.

(56) References Cited

U.S. PATENT DOCUMENTS

| | | | |
|---|---|---|---|
| 6,885,291 B1* | 4/2005 | Pollack | B60C 23/0493 340/447 |
| 7,581,439 B2 | 9/2009 | Rensel et al. | |
| 7,832,263 B2 | 11/2010 | Rensel et al. | |
| 9,905,931 B2 | 2/2018 | Kilian | |
| 11,641,053 B2 | 5/2023 | Fenkanyn et al. | |
| 2007/0256485 A1* | 11/2007 | Rensel | B60C 23/0493 340/447 |
| 2009/0277262 A1 | 11/2009 | Rensel et al. | |
| 2014/0303906 A1* | 10/2014 | Charlot | G01R 31/083 702/59 |
| 2016/0197408 A1* | 7/2016 | Kilian | H01Q 1/2216 343/793 |
| 2021/0021015 A1* | 1/2021 | Fenkanyn | B60C 23/0493 |

OTHER PUBLICATIONS

International Search Report dated Oct. 6, 2022, in corresponding PCT/FR2022/051481 (5 pages).

* cited by examiner

RADIOFREQUENCY READING SYSTEM ON BOARD A MEANS OF TRANSPORT

FIELD OF THE INVENTION

The present invention relates to a system for reading a radiofrequency transponder on board a transport means. The radiofrequency transponders are linked to the movable assemblies of the transport means.

TECHNOLOGICAL BACKGROUND

The recent development of connected objects requires them to be equipped with radiofrequency transponders. These transponders generally operate in the UHF (acronym for Ultra-High Frequency) frequency range. In the case of transport means such as rubber-tyred vehicles or conveyor belts, the connected objects are movable components of these transport means. As a result, they are movable in operation, moving in a plane about axes of rotation fixed in relation to the transport means.

Document US20210021015A1 presents, in the case of a land vehicle, the installation of an on-board reading system for RFID (acronym for RadioFrequency IDentification) tags and TMS (acronym for Tyre Mounted Sensor) sensors located in the tyre casings of the mounted assemblies of the land vehicle. The system is formed of a radiofrequency reader/transmitter galvanically connected to four transmission lines as far as radiofrequency antennas covering a certain geographical area. The radiofrequency antennas are rigidly fixed to the fixed part of the land vehicle. This solution requires multiple radiofrequency antennas, which are generally two-dimensional and flat, or even three-dimensional. This creates a spatial footprint within the land vehicle that is detrimental to the installation of the other land vehicle components. In addition, the separation of the various elements (the radiofrequency reader, the transmission line and the radiofrequency antenna) multiplies the number of connection points between the various elements, which in turn multiplies the risk of failure of the reading system due to the vibrations and shocks to which the transport means is generally subjected. Lastly, the multitude of assemblies mounted on a land vehicle means that there are multiple transmission lines and radiofrequency antennas, which is costly.

One of the objects of the following invention is to solve the problems of reliability and cost of systems for reading movable radiofrequency transponders in transport means.

In order to gain a better understanding of the invention, what is meant here by the circumferential direction S, axial direction A and radial direction R is directions defined with respect to the rotating frame of reference of the movable assembly about its natural axis of rotation. The radial direction R is the direction extending perpendicularly away from the natural axis of rotation. The axial direction A is the direction parallel to the natural axis of rotation. Finally, the circumferential direction S forms a direct trihedron with the predefined radial and axial directions.

SUMMARY OF THE INVENTION

The invention relates to an arrangement of a transport means and a radiofrequency transponder reading system, the transport means being equipped with at least one movable assembly capable of ensuring the relative movement of the transport means with respect to another mechanical system, the movable assembly consisting of a deformable part set in motion about at least one axis of rotation by a non-deformable assembly, the free movement of the at least one movable assembly taking place in a predominantly two-dimensional plane in a reference frame associated with the at least one movable assembly, the deformable part of the at least one movable assembly defining a median plane which is perpendicular to the one or more axes of rotation, the at least one movable assembly, preferably the deformable part, being equipped with a radiofrequency transponder, the reading system comprising:

a generator of electrical signals emitting at a frequency F0 included in the ultra-high frequency band, coupled to a demodulator of electrical signals adapted to a frequency band around F0, mounted on the transport means;

at least one bidirectional communication cable comprising a conductive core covered with a dielectric material, itself covered with a conductive assembly, being partly flexible, having one end galvanically connected to the signal generator, the length lo of which is divided according to a metric of which the unit is a wavelength defined by the frequency F0;

the at least one cable being fixed to the transport means externally of the at least one movable assembly, comprising a radiating part.

The arrangement is characterized in that the curvilinear abscissa of a first continuous part of the radiating part of the at least one cable is at least greater than one unit of cable length, in that the distance of the orthogonal projection P of the first continuous part of the radiating part of the at least one cable on a plane of the deformable part located between two contiguous axes of rotation and collinear with these two axes of rotation and/or the distance of the radial projection R of the first continuous part of the radiating part of the at least one cable on a cylinder, of axis of revolution coaxial with the axis of rotation of the at least one non-deformable assembly, circumscribing the deformable part in contact with the at least one non-deformable assembly, is less than or equal to 1 metre, preferably less than or equal to 0.5 metre, and in that the distance of the axial projection A, in the direction of the one or more axes of rotation, of the first continuous part of the radiating part of the at least one cable on the median plane of the deformable part of the at least one movable assembly is less than or equal to 2 meters, preferably less than 1 meter, very preferably less than 0.5 meter.

The term "free movement" means that the movement is carried out without displacement constraint in the same way as an imposed displacement movement. For example, in the case of a statically-loaded mounted assembly set in rotation, this refers to the movement of the material points of the mounted assembly outside the zone of contact of the tyre casing with the ground, commonly known as the contact area. In fact, in this zone, the movement of a material point of the tyre casing in contact with the ground is guided by the ground as long as the sliding condition is not reached; thus, imposed displacement is achieved, which does not fall within the definition of free movement.

Firstly, the movable assembly is the sub-assembly of the transport means used to move the transport means relative to another mechanical system. The movable assembly comprises a deformable part driven in rotation about one or more axes of rotation by non-deformable parts, i.e. parts that are more rigid than the deformable part. This movable assembly may be a mounted assembly of a motor vehicle comprising a tyre casing, constituting the deformable part, rotated about a single axis of rotation by the rim, constituting the non-deformable part with respect to the tyre casing. Alternatively, in the case of caterpillar traction, these may constituted by a tread formed of a rubbery material and drive wheels, which are generally circular in shape, of the tread. Each drive wheel rotates about an axis of rotation. Lastly, the conveyor belt of a conveyor can also be used as the deformable part, and the drive rollers of the conveyor belt, of which there are at least two, constitute the non-deformable part with respect to the conveyor belt. Each drive roller is set in rotation about its, generally own, axis of rotation.

The radiofrequency transponder can be an RFID tag or an active electronic device with its own power source. The radiofrequency transponder is fixed to the movable part of the transport means. This can be an RFID tag in a tyre casing, a TPMS (acronym for Tyre Pressure Monitoring System) sensor attached to the wheel, or any electronic object communicating by radiofrequency and equipped with a radiofrequency antenna located on a movable assembly.

In order to read this electronic object, which is linked to the movable assembly and therefore is linked in movement in the transport means, the invention discloses the placement of a reading system on board the transport means, outside the movable assembly. As a result, it is not linked to the movement of the movable assembly. This reading system comprises a first device comprising a transmitter of electrical signals at a fixed frequency and a demodulator of electrical signals on a frequency band around the fixed frequency. This first device is connected to a bidirectional communication cable. This cable is composed of a conductive core, which is hollow or solid, generally metallic, and a second conductive hollow tube coaxial to the conductive core. A dielectric material separates the two conductive components. One end of the cable is connected to the transmitting/receiving electronic device, while the other end is free. This cable comprises at least one radiating part, i.e. it functionally transmits or receives radio waves externally to the hollow conductor tube via various structural solutions. For example, a possible cable is a leaky feed antenna of which the outer hollow tube is provided in the radiating part with spatially distributed apertures of appropriate dimensions that are related to the wavelength of the radio waves transmitted or received by the antenna cable. Outside the radiating zones, the coaxial cable acts as a waveguide.

The invention is based first and foremost on the particular arrangement of the reading system and, in particular, of the radiating part of the bidirectional communication cable in relation to the path followed by the radiofrequency transponder driven in motion by the movable assembly. In fact, the spatial distance between the radiating part of the cable and the radiofrequency transponder must be less than a certain distance, preferably one meter, during part of the loop describing the path taken by the movable assembly. This is ensured by three conditions linked to the structure of the movable assembly. In fact, since the movable assembly has a primarily two-dimensional movement, in the reference frame linked to the movable assembly, outside the zones of imposed displacement, it is possible to define a median plane for the deformable part of the movable assembly, which has the property of being perpendicular to all the axes of rotation of the movable assembly and of separating the movable assembly into two symmetrical parts with respect to the median plane. The term "primarily bidirectional movement" means that the distance covered by a material point of the movable assembly between two instants, decomposed on an orthonormal reference frame linked to the movable assembly, has one component smaller than the other two. Generally speaking, this component is the one carried by the direction of the axes of rotation of the movable assembly.

The first condition is that a continuous sub-part of the radiating part of the communication cable is no further than 2 metres from the median plane attached to the deformable part of the movable assembly in the direction of the axes of rotation of the movable assembly. Naturally, the smaller the distance between the continuous part of the radiating part of the cable, the better the radiofrequency communication between the two radiofrequency devices.

Then, the deformable part of the movable assembly is either driven by a fully rotational movement about a single axis of rotation, as is the case, for example, for a mounted assembly for a motor vehicle, or is driven by a movement combining partial rotations about several axes of rotation with translational movements between these partial rotations, as is the case, for example, for the conveyor belt of a conveyor or the caterpillar tracks of a land vehicle. It is necessary to control the distance between the continuous part of the radiating part of the bidirectional communication cable and the deformable part of the movable assembly. To this end, two projection conditions must be respected. The first, concerning the zone of the deformable part in partial rotation about an axis of rotation, consists in defining the maximum radial projection distance R of the continuous part of the radiating part of the bidirectional communication cable on the closest surface of the deformable part of the movable assembly driven by this rotational movement and therefore in contact with the non-deformable part of the movable assembly. The second consists in defining the maximum orthogonal projection distance P of the continuous part of the radiating part of the bidirectional communication cable on the nearest surface of the deformable part of the movable assembly. This surface is necessarily collinear with the axes of rotation of the movable assembly delimiting the translational movement of the deformable part.

When these three conditions are met at the same time during a part of the loop describing the path of the radiofrequency transponder fixed to the movable assembly, it is ensured that the continuous part of the radiating part of the bidirectional communication cable is potentially in communication with the radiofrequency transponder on this part of the loop, and, moreover, this communication is spatially periodic since it is repeated on each loop. Naturally, the larger this part of the loop, the better the communication between the two components. Preferably, the condition is met over the entire loop describing the path of the radiofrequency transponder.

Lastly, it is necessary that the continuous part of the radiating part of the bidirectional communication cable which is in this spatial zone with respect to the movable assembly has a curvilinear length greater than one unit of cable length. The unit of cable length is defined by the wavelength associated with the frequency F0 at which the radio signal is transmitted by the reading system. This ensures that the length of the antenna in the spatial zone delimited by the three geometric conditions is suitable for transmitting and receiving radio signals to and from the radiofrequency transponder fixed to the movable assembly. Of course, the greater the length of the continuous part of the radiating part of the bidirectional communication cable, the better the communication between the reading system and the radiofrequency transponder.

According to a preferred embodiment, the radiating part of the at least one cable comprising at least one second continuous part disjoint from the first continuous part, the curvilinear abscissa of the at least one second continuous part is at least greater than one unit of cable length, the distance of the orthogonal projection P of the at least one second continuous part of the radiating part of the at least one cable on a plane of the deformable part of the at least one second movable assembly located between two contiguous axes of rotation and collinear with these two axes of rotation and/or the distance of the radial projection R of the at least one second continuous part of the radiating part of the at least one cable on a cylinder, of axis of revolution coaxial with the axis of rotation of at least one of the non-deformable assemblies of the at least one second movable assembly, circumscribing the deformable part in contact with the at least one of the non-deformable assemblies of the at least one second movable assembly, is less than or equal to 1 metre, preferably less than 0.5 metre, and the distance of the axial projection A, in the direction of the one or more axes of rotation of the at least one second movable assembly, of the at least one second continuous part of the radiating part of the at least one cable on the median plane of the deformable part of the at least one second movable assembly is less than 2 metres, preferably less than 1 metre, very preferably less than 0.5 metres.

This is a configuration where the bidirectional communication cable is able to interrogate movable assemblies of the same transport means that are so far apart that the same continuous part of the radiating part of the communication cable cannot interrogate both movable assemblies. The conventional solution would then be to add a second bidirectional communication cable and position a continuous part of the radiating part of this second cable in the appropriate geographical area of the second movable assembly, which is costly. The solution here is to use the same bidirectional communication cable, which limits the number of galvanic connections to the electrical signal transmitter/receiver of the reading system. This cable is then equipped with a second continuous radiating part that is separate from the first continuous part. However, this may be the same radiating part of the cable. In this way, the same cable interrogates and receives information from each radiofrequency transponder associated with a different movable assembly in each case. To create two strongly radiating spatial zones, the radiating part of the cable must simply be passed over the same spatial zone several times to create a continuous part. This creates a highly radiating zone, enabling easy communication with the transponders of the transport means passing through the spatial zone. Of course, it is possible to create several strongly radiating spatial zones, separate from each other, using this technique. Between these strongly radiating spatial zones, the cable has a lesser radiating behaviour, which nonetheless enables the transmission of radio signals along the cable to the reader. It is, of course, possible to multiply the continuous and radiating parts along the length of the communication cable in order to communicate with several movable assemblies that are geographically distant from one another, and to communicate with all the radiofrequency transponders of the transport means, whether or not these are linked to a movable assembly of the transport means. Similarly, a continuous part of the radiating part of the bidirectional communication cable can communicate with different movable assemblies as long as they are located at the right distance from the continuous part of the radiating part of the cable.

Advantageously, the at least one cable is equipped at its free end with a conductor connected to the conductive core and covered with a second dielectric material, itself partly covered by the conductor assembly of which the connector length is adapted to the frequency band of the reading system for capacitive coupling performance.

This type of bidirectional communication cable uses surface radio waves via this reflection device. This makes it possible to have a bidirectional cable with no specificities on its surface on the radiating part. Thus, in the event of strong deformation of the cable when it is installed in the transport means, the communication functionality of the cable is not affected, as could be the case with a leaky feed antenna, the distribution of which and the shapes of the orifices passing through the conductive tube are more sensitive to deformation of the bidirectional cable. Furthermore, this technical solution is more economical, since the orifices on the conductor tube are considerably more expensive than placing an electrical reflection device by capacitive coupling at the end of a coaxial cable.

This type of cable is described in patent application US2016/0197408A1, comprising at its free end an electrical reflection device by capacitive coupling, consisting of a conductive component connected to the conductive core and optionally separated from the conductive tube by a second dielectric material generating capacitive coupling. The length of the conductive component is generally a quarter of the wavelength of the radio waves transmitted and received by the cable antenna. This device creates radioelectric surface propagation waves on the conductive tube in the direction opposite to that emitted by the signal generator, up to a surface wave attenuation zone created by magnetized rings, generally made of ferrite, mounted axially outside the cable.

In a specific embodiment, in the radiating part of the cable, the conductor assembly is covered by a second conductor assembly which is connected to ground.

This limits the electromagnetic radiation from the cable in the conveying medium, which may be necessary depending on the electromagnetic compliance of the conveying medium.

According to a particular embodiment, the radiofrequency antenna of the radiofrequency transponder comprising at least one wire strand defining a first longitudinal axis, and the first and/or at least one second continuous part of the radiating part of at least one cable defining a median line, the angle formed by the director vectors of the first longitudinal axis and the median line is less than 30 degrees, preferably less than 10 degrees, over at least part of the closed path described by at least one movable assembly.

In the special case where the radio transponder is fitted with a wired antenna, the two electronic assemblies are fitted with unidirectional antennas. In order to communicate, it is necessary that the directions of the axes of the two antennas are not perpendicular to each other, to ensure electromagnetic coupling between them. Ideally, the two directions should be collinear so that the efficacy of the coupling is maximal. However, the level of communication between the two antennas remains totally adequate as long as the angle formed by the two directions is less than 30 degrees. This is preferable when the radiofrequency transponder is passive, i.e. without its own source or production of electrical energy. In this case, the electromagnetic coupling serves to activate the radiofrequency transponder by transmitting energy to it before it transmits.

Of course, since the radiofrequency transponder is in motion while the reading system is fixed relative to the transport means, the angular condition is not necessarily met over the entire path described by the radiofrequency transponder. However, it is sufficient for the angular condition to be met over part of the path taken by the movable assembly for radiofrequency communication between the two electronic systems to be effective.

Preferably, the radiofrequency transponder is an RFID (RadioFrequency IDentification) tag.

This is the ideal radiofrequency transponder for communicating the identifier of an object, and in particular the identifier of the movable assembly or one of its components. In general, these tags are passive to minimize transponder mass and cost, and to ensure reliability of the radiofrequency transponder throughout the life of the product and, in particular, of the components of the movable assembly. Lastly, the integration of these tags within elastomer compounds is possible while ensuring good physical integrity for both the RFID tag and that of the elastomer components.

Very preferably, the transport means is included in the group comprising a tracked land vehicle, a land vehicle with deformable and elastic tyres, and a conveyor belt.

Also very preferably, the deformable part of the movable assembly is included in the group comprising a deformable and elastic tyre, an elastomer mix conveyor belt and an elastomer mix caterpillar track.

The use of RFID tags, but also of active radiofrequency sensors, is becoming increasingly widespread for identifying or monitoring objects, opening the door to logistics services and enabling the personalization of certain systems on the transport means, which is leading to improved use of these systems. RFID tags are the smallest radiofrequency transponders to date, providing at least an identification function for the object to which they are attached. These transport means are often fitted with a conveyor belt system, whether a tread, conveyor belt or pneumatic tyre system, which represent wear parts of the transport means. Identifying these removable parts, which age more rapidly than the transport means, enables predictive maintenance. Depending on the state of ageing or wear of these components, it may be necessary to adjust the settings of the transport means to optimize its operational performance. Since these parts are deformable by nature, the level of deformation is high. For this reason, the use of small RFID tags is preferable to ensure both the physical integrity and endurance of these deformable parts.

According to a very particular embodiment, the movable assembly describes a rotational movement about a single axis of rotation, and the continuous part of the at least one cable describes an angular sector about the single axis of rotation at least greater than 30 degrees, preferably greater than 60 degrees, very preferably greater than 120 degrees.

The first condition of movement of the movable assembly illustrates, for example, the case of mounted assemblies for motor vehicles. In this case, the rim-mounted tyre casing constitutes the mounted assembly, which is rotated about a single axis of rotation. In this case, it is preferable that, in a rotating reference frame associated with the single axis of rotation, the continuous part of the radiating part of the bidirectional communication cable extends over an angular sector of at least 30 degrees. In this way, depending on the speed of rotation of the movable assembly about its single axis of rotation, a certain duration of communication is ensured between the radiofrequency transponder rotating with the movable assembly and the reading system fixed in the transport means. Of course, the larger the angular sector, the longer the communication time at a given rotation speed.

Preferably, the continuous part of the radiating part of the at least one cable is fixed to the at least one wall delimiting the cavity of the transport means receiving the movable assembly.

In the case of a movable assembly rotating about a single axis of rotation, such as the one comprised by a tyre casing in a car, direct or indirect attachment of the continuous part of the radiating part of the bidirectional communication cable to the wheel arch is preferred. The wheel arch delimits the cavity where the vehicle-mounted assembly will be connected in use. In general, this component is non-metallic, which means that there is no shielding effect or radio interference. The propagation of radio waves between the communication cable and the transponder is enhanced by the absence of mechanical components between the two antennas. Lastly, the cavity naturally provides a free area for the communication cable to be installed in an extremely small space such as that of a motor vehicle.

Very preferably, the continuous part of the radiating part of the at least one cable extends at a constant radial distance from the single axis of rotation of the movable assembly.

This condition ensures reliable radiofrequency communication between the two components in the case of a passive radiofrequency transponder, such as an RFID tag, in the tyre casing. Indeed, it is commonly accepted to position the RFID tag at the tyre sidewall in a predominantly circumferential direction with respect to the axis of rotation of the mounted assembly. In addition, the shape of the walls delimiting the mounting cavity of the assembly generally follows this geometric condition. As a result, communication between the two antennas is optimized in terms of both duration and quality.

Preferably, the radiofrequency transponder transmits at a sub-carrier frequency.

In these applications, the radiofrequency transponder uses the radiofrequency transmission signal it receives to transmit the answer to its interrogation. This mode of operation is particularly common in passive RFID tag-type radiofrequency transponders, i.e. transponders without their own energy source for emission. These communication modes employ various modulations, depending on whether the aim is to enhance the communication sensitivity of the bidirectional communication cable or the communication speed between the two radiofrequency devices. The modulation is characterized primarily by two variables: the number of transitions for a binary state—physically, this is a change of state of the radiofrequency transponder impedance of the electronic chip of an RFID tag, for example, which induces a change in the amplitude and phase of the return signal—and the unit period for observing the transitions. To enhance the sensitivity of the communication cable, it is advisable to work on a large number of transitions for a binary state over a high unit period. For example, Miller 8 coding, applicable to UHF RFID, offers a 10 to 20 dBm gain in sensitivity. On the other hand, limiting the number of transitions to a single transition per unit period over a short unit period favours transaction throughput between the radiofrequency transponder and the bidirectional communication cable, and in fact maximizes it. FM0 modulation, i.e. one transition per unit period of 7.6 µs for example, increases the read rate of the bidirectional communication cable by a factor of 10 compared with Miller 8 modulation.

Very preferably, the sub-carrier frequency of the radiofrequency transponder comprises a number of transitions of less than 5, preferably a single transition over the unit period of the sub-carrier frequency.

Very preferably, the sub-carrier frequency of the radiofrequency transponder has a unit period of less than 10 µs, preferably less than 8 µs.

Opting for short periods and few transitions favours the radiofrequency communication rate between the radiofrequency transponder and the bidirectional communication cable, i.e. the reading rate of the continuous part of the radiating part of the communication cable, which is favourable in the context of the envisaged arrangement. Indeed, the arrangement is characterized by read distances between the bidirectional communication cable and the radiofrequency transponder of less than 1 meter over a short coupling time between the two devices, due to the relative movement of the radiofrequency transponder mounted on the movable assembly. The inventor has found that this mode of modulation is particularly advantageous for tracked or pneumatic transport vehicles, where the continuous part of the radiating part of the communication cable is directly opposite the deformable part of the movable assembly.

BRIEF DESCRIPTION OF THE DRAWINGS

The invention will be better understood upon reading the following description, given solely by way of non-limiting example and with reference to the appended figures, throughout which the same reference numerals denote identical parts, and in which.

DETAILED DESCRIPTION OF EMBODIMENTS

Figure 1A:
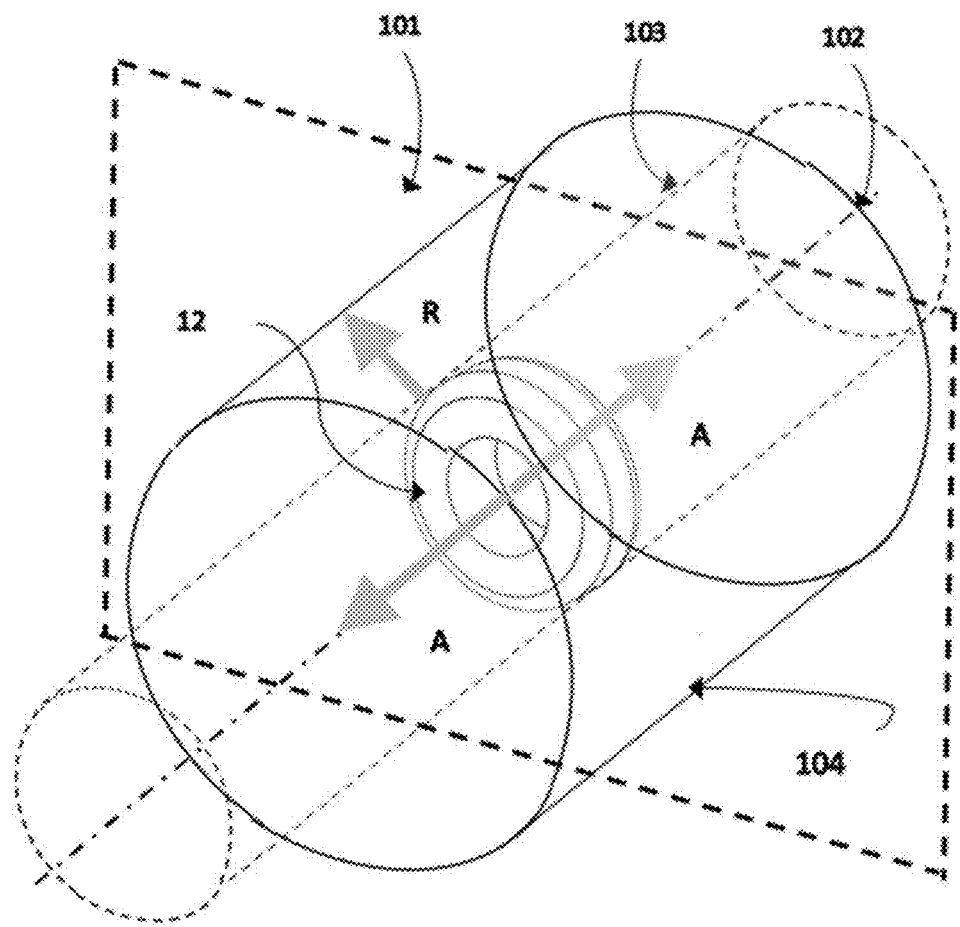
FIGS. 1a and 1b show a perspective view of the communication space of the radiating part of the communication cable with the movable assembly, according to two movable assembly applications.

FIG. 1a shows a tyre casing 12 representing the deformable part of a movable assembly consisting of said tyre casing mounted on a rim, the rim not being shown here. The tyre casing or deformable part 12 rotates about a natural axis of rotation 102. The deformable part 12 defines a median plane 101 which is perpendicular to the axis of rotation 102, separating the deformable part 12 into two sub-parts symmetrical with respect to the median plane 101. This deformable part 12 is equipped with an RFID-type radiofrequency transponder, i.e. without its own energy source, used to measure the inflation pressure of the movable assembly using a pressure sensor, which corresponds to an RFID sensor-type electronic device. This deformable part 12 also includes an active TPMS-type sensor mounted on the rim valve. The radial, azimuthal and axial positions of these radiofrequency devices are generally arbitrary in the movable assembly.

The deformable part 12 is circumscribed in a cylinder 108 with axis of revolution 102, resting on the radially outermost position of the crown of the tyre casing in relation to the axis of rotation 102. Here, the deformable part is inflated but not statically loaded, and the cylinder 108 rests on a multitude of points on the crown, evenly distributed around the perimeter of the crown.

The installation space 104 of the continuous part of the radiating part of the bidirectional communication cable can then be defined as a cylinder with an axis of revolution coaxial with the axis 102, extending radially with respect to the axis 102 from the outer surface of the cylinder 108 at a distance R materialized by the grey arrow represented in the median plane 101. This cylinder 104 is straight since it is limited by plane faces collinear to the median plane 101 located on either side of the median plane 101 at an axial distance A from the median plane 101 in the direction of the axis 102. These axial distances A are visualized by grey arrows carried by the axis 102. It is imperative to position a continuous part of the radiating part of the directional communication cable with a length of at least one unit of cable length, defined by the transmission frequency F0 of the reading system, in the straight cylinder 104 so that the radiofrequency devices of the movable assembly can communicate with the reading system installed on the transport means using said bidirectional communication cable.

Figure 1B:
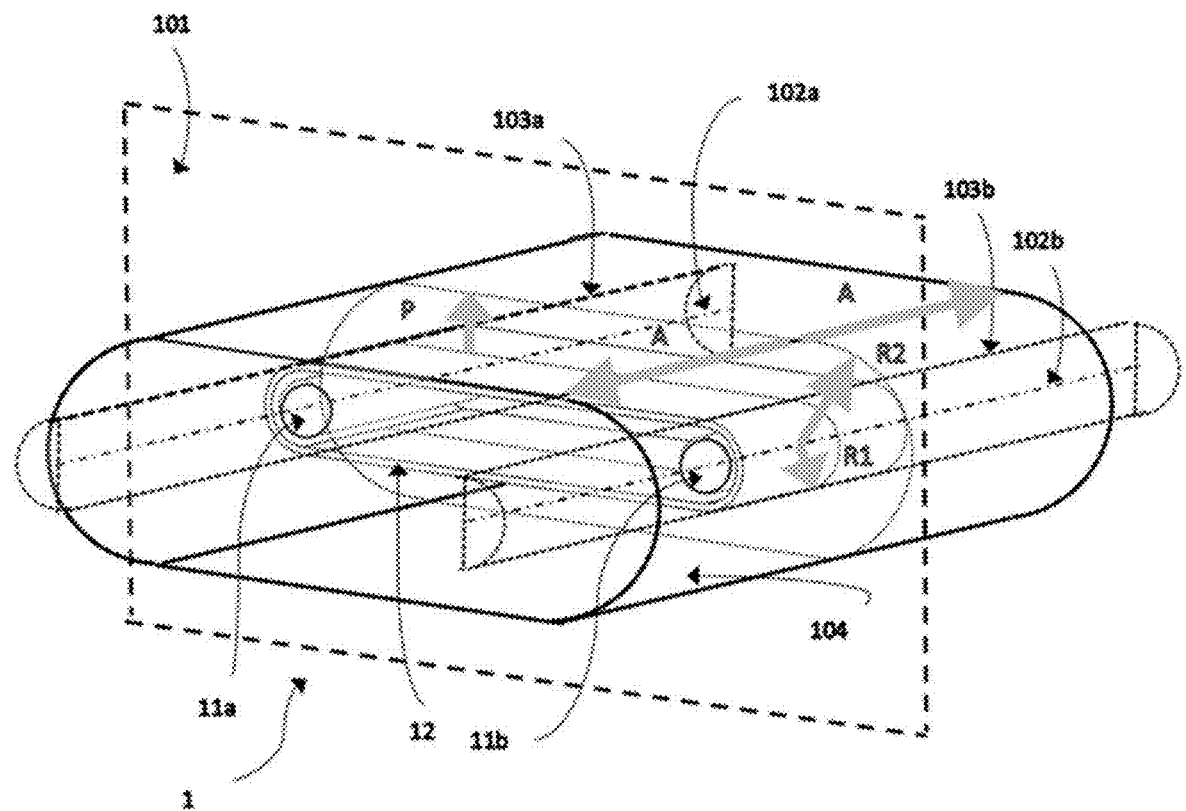

FIG. 1b shows a conveyor belt 1 as a movable assembly, comprising a conveyor belt 12, representing the deformable part of the movable assembly, set in motion by two drive rollers 11a and 11b serving as the non-deformable part of the movable assembly. These drive rollers 11a and 11b are driven by a thermal propulsion system, not shown in the figure, of the transport means.

The conveyor belt or deformable part 12 rotates about two natural axes of rotation 102a and 102b. The deformable part 12 defines a median plane 101 which is perpendicular to the axes of rotation 102a and 102b, separating the deformable part 12 into two sub-parts symmetrical with respect to the median plane 101. This deformable part 12 is equipped with an RFID-type radiofrequency transponder, i.e. without its own energy source, used to identify the conveyor belt.

The deformable part 12 can be divided at any time into three zones. The first zone corresponds to the rotation of the conveyor belt about the axis of rotation 102a by means of the drive roller 11a, and is shown in the figure as a semicircle. The second zone corresponds to the rotation of the conveyor belt about the second axis of rotation 102b by means of the second drive roller 11b. Lastly, the third zone corresponds to the remainder of conveyor belt 12, where the movement of the conveyor belt 12 in this zone corresponds to a translational movement in a direction perpendicular to the axes of rotation 102a and 102b. The first zone is circumscribed by a half-cylinder 103a with axis of revolution 102a, resting on the radially outermost position of the conveyor belt 12 in the first zone relative to the axis of rotation 102a. By its very nature, this cylinder extends infinitely in the direction of the axis of rotation 102a. The second zone is similarly circumscribed by a half-cylinder 103b with axis of revolution 102b, resting on the radially outermost position of the conveyor belt 12 of the second zone relative to the axis of rotation 102b.

The installation space 104 of the continuous part of the radiating part of the bidirectional communication cable can then be defined as the geometric shape made up of several elementary geometric shapes.

Firstly, and in the case of FIG. 1b, for the second zone of the conveyor belt 12, the elementary shape is a half-cylinder with an axis of revolution coaxial with the axis 102b, extending radially with respect to the axis 102b from the outer surface of half-cylinder 103b to a distance R which is materialized by the difference of the grey arrows R2 and R1 represented in the median plane 101. This first half-cylinder is straight, since it is limited by plane faces collinear to the median plane 101 located on either side of the median plane 101 at an axial distance A from the median plane 101 in the direction of the axis 102b. These axial distances A are visualized by grey arrows collinear to the axis 102b. In a similar way, for the first zone of the conveyor belt 12, the elementary shape is also a half-cylinder with an axis of revolution coaxial with the axis 102a, extending radially with respect to the axis 102a from the outer surface of the half-cylinder 103a at the same distance R as the first half-cylinder. Here, the rollers 11a and 11b have identical radii, noted R1, but in general they can be different. However, the radial distance R from the outer surface of the conveyor belt 12 is always identical between the half-cylinders.

In the general case, the first and second zones are cylinder portions which are inversely proportional to the number of axes of rotation of the movable assembly 1. For example, if the movable assembly 1 has 3 axes of rotation of type 102, the cylinder portions correspond to thirds of a complete cylinder.

This second half-cylinder is straight, since it is limited by plane faces collinear to the median plane 101 located on either side of the median plane 101 at the same axial distance A from the median plane 101 in the direction of the axis 102*a*. In general, these are always portions of a straight cylinder, as they are delimited by plane faces collinear to the median plane 101.

Lastly, the third elementary form of the installation space 104 is a polyhedron, in the case of FIG. 1*b* a hexahedron, comprising two faces parallel to the median plane 101, each spaced by an axial distance A on either side of the median plane 101. The polyhedron is completed by the closing planes of the cylinder portions constructed from the radial distance R from the outer surface of the conveyor belt 12. In the case of FIG. 1*b*, as the axes of rotation of the movable assembly 1 are two in number, the closing planes are two in number and parallel to each other. However, whatever the number of closing planes, they are perpendicular to the median plane 101 and thus to the initial plane faces of the polyhedron. In the general case where the number of axes of rotation of the movable assembly 1 is greater than 2, each cylinder portion will delimit two closing planes forming an angle between them equal to the cylinder portion. For example, if the movable assembly comprises 3 axes of rotation, each third of a cylinder comprises two closing planes forming an angle of 120 degrees between them. Necessarily, each closing plane of a cylinder portion finds a closing plane parallel to it on a cylinder portion of an axis of rotation contiguous to the first axis of rotation. Lastly, the polyhedron is closed by a number of plane faces equal to the number of axes of rotation of the movable assembly 1 that are perpendicular to the median plane 101. Here, the movable assembly 1 of the conveyor has two axes of rotation, and the polyhedron, which is a hexahedron, is closed by two planes joining the free edges of the half-cylinders in pairs. These planes are parallel for the sole reason that the non-deformable assemblies 11*a* and 11*b* of the movable assembly 1 have identical radii.

Of course, the definition of the plane of installation 104 of the continuous part of the radiating part of a bidirectional communication cable is quite similar in the case of a tracked movable assembly with two or more drive wheels having collinear axes of rotation.

It is imperative to position a continuous part of the radiating part of the directional communication cable with a length of at least one unit of cable length, defined by the transmission frequency F0 of the reading system, in the polyhedron 104 so that the radiofrequency devices of the movable assembly 1 can communicate with the reading system installed on the transport means.

Figure 2:
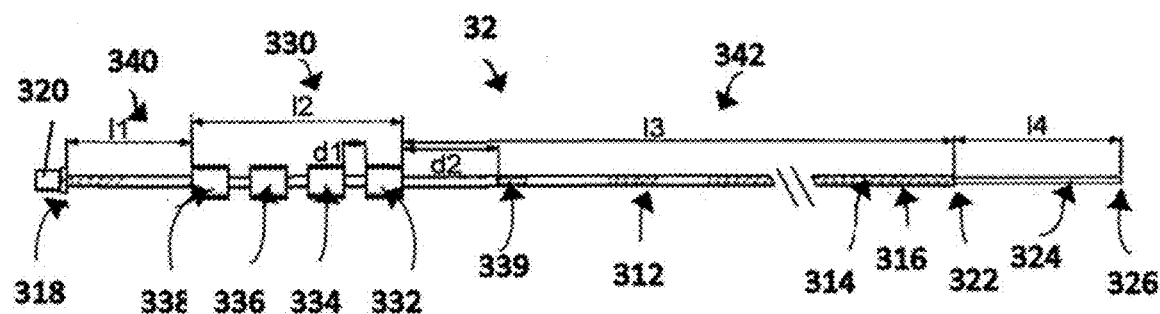
FIG. 2 shows a method for implementing the bidirectional communication cable of the reading system according to the invention.

FIG. 2 shows a bidirectional communication cable 32 in a different configuration to the leaky feed antenna, which works perfectly well, but not exclusively, for RFID tag applications.

The cable 32 comprises an elongate bipolar coaxial conductor structure 312 with an electrically conductive inner conductor 314 and an electrically conductive sheath conductor 316 coaxially surrounding inner conductor 314. In the illustrated example, the inner conductor 314 is cylindrical and the sheath conductor 316 is hollow and cylindrical.

Both the inner conductor 314 and the sheath conductor 316 are made of a metallic material, wherein an electrically insulating intermediate layer (e.g. plastic) is advantageously present radially between the inner conductor 314 and the sheath conductor 316 over the entire length of the conductive structure 312.

A first end 318 of the conductive structure 312 is provided for connecting a transmitter and/or receiver of the reading system for an antenna signal to be transmitted using cable 32 or an antenna signal to be received by cable 32, respectively. The cable 32 is provided with a conventional coaxial plug 320 for this purpose in the illustrated example, which coaxial plug realizes an electrical connector for the inner conductor 314 and for the sheath conductor 316 at this first end 318 in a conventional manner.

An extension 324 of the inner conductor 314, which is integrally formed with the inner conductor 314 in the illustrated example and is therefore electrically connected to the inner conductor 314, is provided at a second, opposite end 322 of the conductor structure 312. This extension 424 extends away from the sheath conductor 316, starting from the second end 322 of the conductive structure 312, rectilinearly and coaxially to the path of the inner conductor 314 and the sheath conductor 316 directly before the second end 322.

The inner conductor extension 324 extends rectilinearly to a free end 326 of the inner conductor extension 324, wherein some capacitive coupling of the free end 326 or inner conductor extension 324 to the sheath conductor 316 exists in the region of the second end 322 thereof, depending on the length of the inner conductor extension 324.

In one transmission mode of the cable 32, i.e. if an antenna signal to be transmitted is introduced at the coaxial plug 320 of the first end 318, then this antenna signal travels through the conductive structure 312 to the end 322 and is reflected there to a greater or lesser extent, to flow back as a bound progressive wave emanating from the second end 322 along the sheath conductor 316 towards the first end 318.

For an operating mode chosen accordingly, for example with regard to the frequency and power of the injected antenna signal, it can be achieved that the cable 32 creates an alternating electromagnetic field around itself, but radiates relatively little. This cable 32 operates like a progressive-wave antenna in a "coupled mode", so that the range of the cable 32 is well under control.

In the example shown in FIG. 2, a surface wave damping device 330 is arranged on the outer circumference of the sheath conductor 316, at a distance from the second end 322, at a point between the two ends 318 and 322. In the example shown, this device is formed by a plurality of ferrite rings 332, 334, 336 and 338, each of which surrounds the outer circumference of the sheath conductor 316.

The ferrite rings 332 to 338 are arranged at a distance from one another as seen in the longitudinal direction of the conductive structure 312, and advantageously damp said progressive waves, which rise from the second end 322 of the conductive structure 312, when these waves arrive at the location of the damping device 330.

The damping device 330 formed by the ferrite rings 332 to 338 or their arrangement location in the path of the coaxial conductor structure 312 divides the total length of the conductor structure 312 into a signal-conducting section 340 and a radiating section 342, wherein, during operation of the cable 32, the section 340 is used to conduct the antenna signal emanating from or towards the first end 318, and the section 342 is used to transmit information and/or power emanating from the cable 32 or towards the cable 32.

The number of ferrite rings and the individual distances between the ferrite rings can be adapted to the respective application or to the operating parameters of the cable 32.

It can also be provided that at least one ferrite ring, in the case of a plurality of ferrite rings, preferably at least the "first" ferrite ring closest to the second end 322, i.e. ferrite ring 332 in the illustrated example, is arranged so that it can move along the conductive structure 312.

As a result, the properties of the damping device thus formed can be influenced or adapted to the actual application.

Alternatively or in addition to the ferrite rings 332 to 338, the damping device 330 can, in deviation from the illustrated example, also comprise various damping components, such as an electrical network structure consisting of capacitive components and/or inductive and/or resistive elements, which is arranged at a relevant point along the path of the conductor structure 312 and connected on both sides to the sections 340, 342 of the conductor structure 312 leading to the first end 318 and the second end 322.

A main cable component 32 is formed by the coaxial conductive structure 312, which may be a flexible or semi-rigid cable, or a rigid structure, which has an "open end" or the aforementioned inner conductor extension 324.

In the area of the inner conductor extension 324, a sheath conductor 316 forming a shield is removed to some extent in the remaining area of the conductor structure, so that a dipole antenna is created, one arm of which is formed by the inner conductor extension 324 and the other arm of which is formed by the sheath conductor 316. There are other ways of implementing capacitive coupling which are not presented here.

The surface wave damping device 330 formed here by one or more ferrite rings limits the effective antenna length for transmission/reception for the section 342.

In addition to adjusting this antenna length, the position of the damping device 330, in this case the position of the first ferrite ring 332 in particular, also influences the properties of the damping device 330 and therefore the properties of the returning progressive waves.

It is generally advantageous with regard to the desired generation of returning progressive waves if the inner conductor extension 324 has a length which, at least approximately, represents a quarter wavelength of the antenna signal concerned.

For a suitable geometry of the cable 32 and corresponding operating mode, it can be achieved that the majority of an emission signal migrates along the "signal transmitter/receiver section" 342 as sheath current, and comparatively little high-frequency energy is radiated ("coupled mode").

The length of the inner conductor extension 324 can be chosen in such a way that a desired impedance is defined in combination with the position of the first ferrite ring 332 to achieve as high a reflection loss of the cable 32 as possible.

The length of the cable 32 and the lengths of its aforesaid individual sections can be adapted to suit the application in question.

In summary, the structure, functionality and advantages of the cable 32 can be described as follows:

A main cable component 32 is formed by the coaxial conductive structure 312, which may be a flexible or semi-rigid cable, or a rigid structure, which has an "open end" or the aforementioned inner conductor extension 324.

In the area of the inner conductor extension 324, a sheath conductor 316 forming a shield is removed to some extent in the remaining area of the conductor structure, so that a dipole antenna is created, one arm of which is formed by the inner conductor extension 324 and the other arm of which is formed by the sheath conductor 316.

The surface wave damping device 330 formed here by one or more ferrite rings limits the effective antenna length for transmission/reception for the section 342.

In addition to adjusting this antenna length, the position of the damping device 330, in this case the position of the first ferrite ring 332 in particular, also influences the properties of the damping device 330 and therefore the properties of the returning progressive waves.

It is necessary for the desired generation of returning progressive waves if the inner conductor extension 324 has a length which, at least approximately, represents a quarter wavelength of the antenna signal concerned.

For a suitable geometry of the cable 32 and corresponding operating mode, it can be achieved that the majority of an emission signal migrates along the "signal transmitter/receiver section" 342 as sheath current, and comparatively little high-frequency energy is radiated ("coupled mode").

The length of the inner conductor extension 324 can be chosen in such a way that a desired impedance is defined in combination with the position of the first ferrite ring 332 to achieve as high a reflection loss of the cable 32 as possible.

Here, l1 is the length of the signal conductor section 340, l2 is the length of the surface wave damping device 330, l3 is the length of the signal transmitter/receiver section 342 and l4 is the length of the inner conductor extension.

The distance d1 refers to the distance between the ferrite rings 332 and 334. This distance d1 is, for example, between 5 and 20 mm.

The sheath conductor 316 of the coaxial conductor structure 312 has at least one opening, this opening is drawn in dotted lines as an example and marked by 339. The distance of the opening 339 from the damping device 330 is marked by d2 and lies in the range from 1 to 5 m. However, a plurality of openings 339 can also be arranged distributed along the length of the signal transmitter/receiver section 342 with a mutual spacing of between 0.1 and 5 times the signal wavelength.

Figure 3:
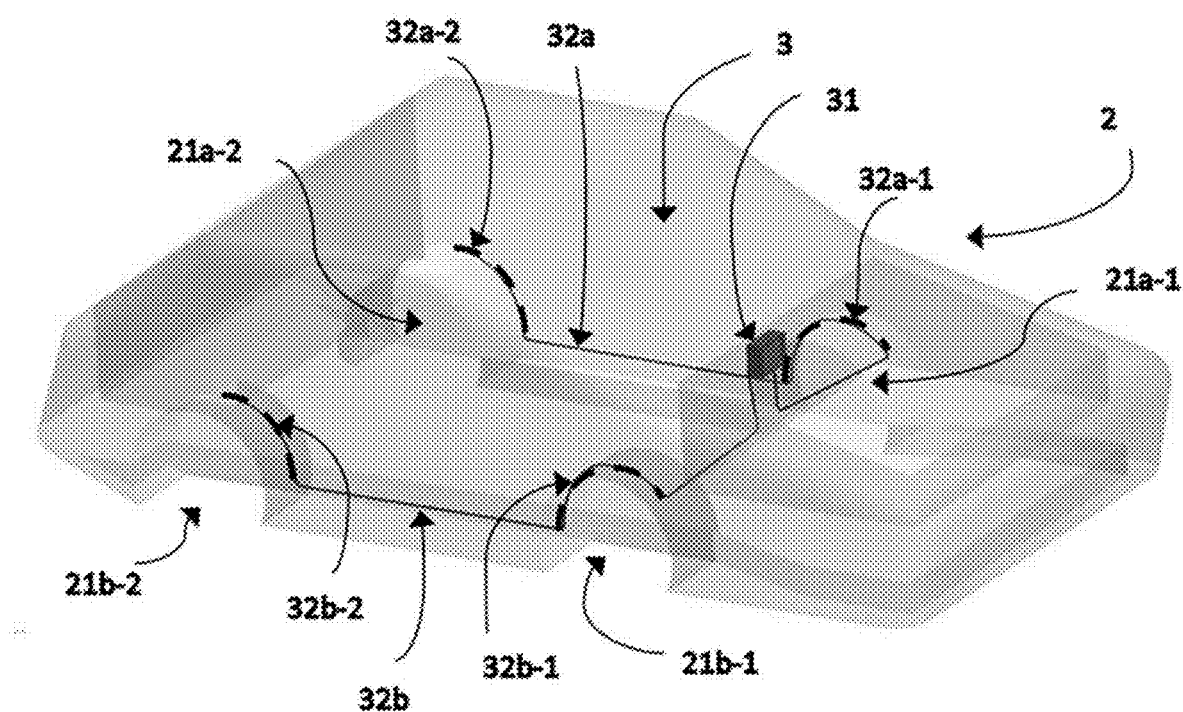
FIG. 3 shows a perspective view of how the reading system is installed in a motor vehicle.

FIG. 3 shows a perspective view of how the reading system 3 is installed in a transport means 2 such as a motor vehicle.

The motor vehicle 2 is represented here by a transparent volume representing the closed, equipped body, corresponding to the complete vehicle from which the axles and drive train have been removed. However, this vehicle 2 shows four cavities, 21a-1, 21a-2, 21b-1 and 21b-2, each designed to accommodate a mounted assembly of the vehicle. The mounted assembly comprises RFID tags and TMS sensors in the tyre casing.

This vehicle 2 also includes the reading system 3 enabling communication with the radiofrequency devices of the mounted assemblies. This reading system 3 comprises a first device for transmitting and reading electrical signals 31, located in the vehicle 2 at the apron, which is a wall that is mainly vertical with respect to the ground where the vehicle travels, delimiting the engine compartment of the vehicle located here at the front of the vehicle 2 from the passenger compartment. This device 31 therefore comprises both the electrical signal transmitter and the electrical signal demodulator.

From this device 31, two bidirectional communication cables 32*a* and 32*b* run to the left and right sides of the vehicle 2 respectively. These communication cables are progressive-wave cables as shown in FIG. 2, and are mounted on the device 31 to form a galvanic connection. Each cable 32*a*, 32*b* runs through the structure of the vehicle 2 to reach the vicinity of at least one cavity receiving mounted assemblies. Each cable has a signal transmission part which starts at the device 31 and then becomes radiating.

In fact, as illustrated in FIG. 3, each cable 32*a*, 32*b* reaches the proximity of two cavities for receiving mounted assemblies each corresponding to the front and rear axles of vehicle 2. At the first cavity 21*a*-1, the cable 32*a* has a continuous part 32*a*-1 which is located at the level of the wheel arch, describing an angular sector around the axis of the front axle of 120 degrees. This part 32*a*-1 of the communication cable 32*a* is located in the communication zone of the radiofrequency devices of the mounted assembly to be accommodated in the cavity 21*a*-1. Thus, this part of the communication cable 32*a* will communicate with the radiofrequency devices of the mounted assembly present in the receiving cavity 21*a*-1.

However, the same cable 32*a* then extends towards the second receiving cavity 21*a*-2 located on the left side of the vehicle 2 at the level of the rear axle. At this cavity 21*a*-2, the cable 32*a* has a continuous radiating second part 32*a*-2 located in the communication zone of the radiofrequency devices of the mounted assembly to be accommodated in the cavity 21*a*-2. The second continuous radiating part 32*a*-2 extends angularly around the axis of rotation of the rear axle over an angular sector of 90 degrees. The rear axle is not directional here, so the assembly moves very little angularly during the driving phase. Consequently, radiofrequency communication between the continuous and radiating part 32*a*-2 of the bidirectional communication cable 32*a* is facilitated compared with that of part 32*a*-1 where the axle is directional, generating angular movement of the mounted assembly when cornering, for example. These two continuous and radiating parts, 32*a*-1 and 32*a*-2 are separate and can only communicate with each other. However, in the case of a twin-wheeled axle, as in the case of a commercial vehicle in traction mode, the continuous part 32*a*-2 located close to the cavity 21*a*-2 would enable communication with the various twin-mounted assemblies located on the same axle and on the same side of vehicle 2.

Similarly, because of the symmetry of the motor vehicle 2, the communication cable 32*b* comprises a radiating part with two separate continuous parts, each communicating with a mounted assembly located on the front and rear axles respectively. The total length of the bidirectional communication cable 32*a* and 32*b* does not exceed 5 meters. The length of the continuous radiating part 32*a*-1, 32*a*-2, 32*b*-1 and 32*b*-2 is greater than 50 centimetres, corresponding to a quarter of the development of a passenger car tyre casing. This length exceeds the cable length unit for UHF radiofrequency communication at 920 MHz or 2.4 GHz.

Figure 4:
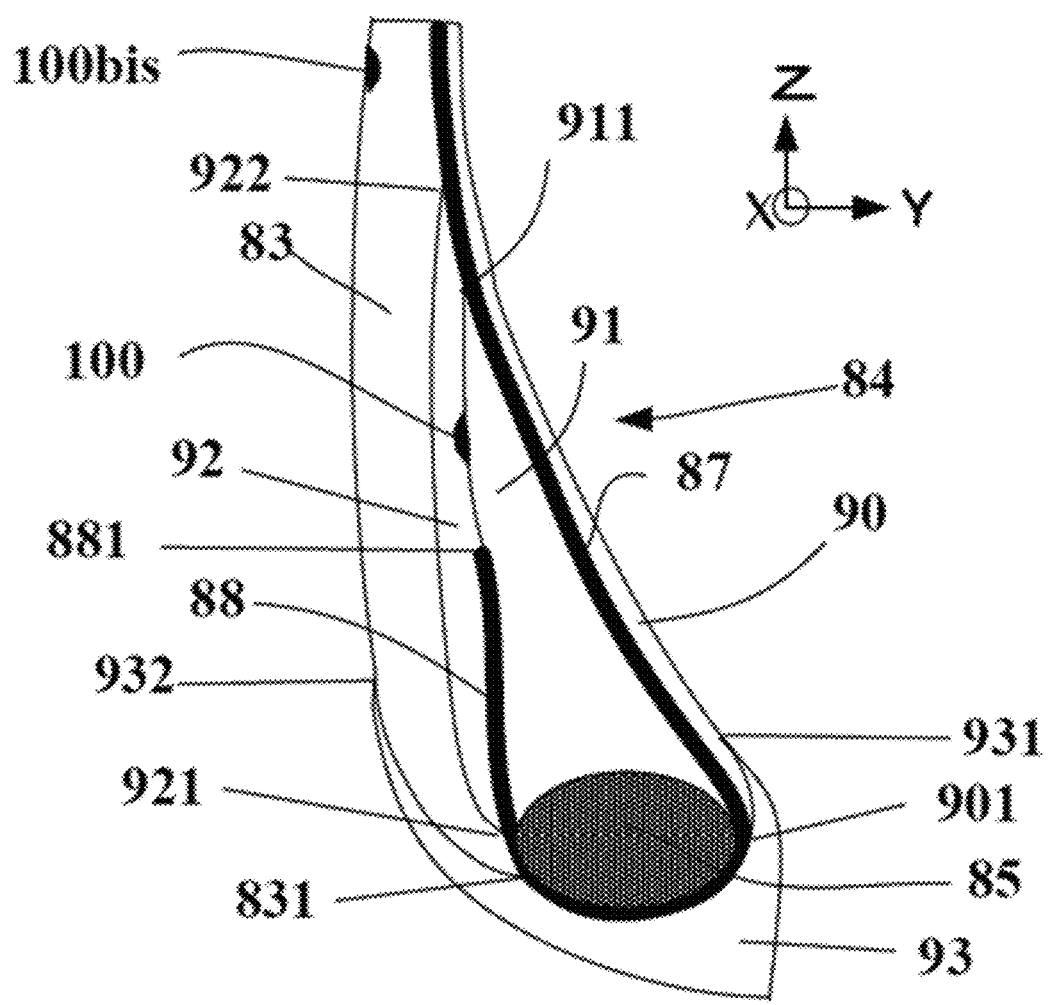
FIG. 4 shows a view in cross section of a tyre inserted equipped with an RFID tag.

FIG. 4 shows a detailed view of a tyre casing which forms the deformable part 12 of a movable assembly 1, which is represented by the mounted assembly formed of a tyre casing in an inflated state mounted on a rim. The rim represents the non-deformable part of the movable assembly. The diagram focuses on the bead 84 of the tyre casing. This figure illustrates the position of the RFID tag-type radiofrequency transponder 100 in the outer zone of the tyre casing with respect to the carcass ply 87.

The bead 84 consists of the bead wire 85, around which the carcass ply 87 is wound, with a folded part 88 situated in the outer zone of the tyre casing. The folded part 88 of the carcass ply 87 ends with a free edge 881. A rubber mass 91, called bead wire filler, is situated radially externally and adjacent to the bead wire 85. It has a radially outer free edge 911 bearing on a face of the carcass ply 87 (more precisely on the outer calendering of the carcass ply, there is no direct contact between the cords of the carcass ply and the radiofrequency transponder 100). A second rubber mass 92, called "reinforcing filler", is adjacent thereto. It has two free edges. The first free edge 921 is situated radially internally and bears on the folded part 88 of the carcass ply. The other free edge 922 is situated radially externally and ends on the face of the carcass ply 87. Lastly, the sidewall 83 covers both the reinforcing filler 92 and the carcass ply 87. The sidewall has a free edge 831 situated radially internally and ending on the folded part 88 of the carcass ply.

The airtight inner liner 90, which is adjacent to the carcass ply 87 in this configuration, is located on the inner zone of the pneumatic tyre. It ends with a free edge 901 adjacent to the carcass ply 87. Lastly, a protective bead 93 protects the carcass ply 87 and the radially inner ends 901, 921 and 831 of the airtight inner liner 90, of the reinforcing filler rubber 92 and of the sidewall 83, respectively. The outer face of this protective bead 93 is able to be in direct contact with the rim flange when mounting the tyre casing on the wheel. This protective bead 93 has two radially outer free edges. The first free edge 931 is situated in the inner zone of the tyre casing 1. The second free edge 932 is situated in the outer zone of the tyre casing 1.

The bead 84 of this tyre casing is equipped with two RFID tags 100 and 100*bis* that are situated in the outer zone of the tyre casing. The first radiofrequency transponder 100, having been encapsulated beforehand in an electrically insulating encapsulating rubber, is positioned on the outer face of the bead wire filler 91. It is positioned at a distance of 20 millimetres from the free edge 881 of the folded part 88 of the carcass ply that constitutes a mechanical singularity. This position ensures a zone of mechanical stability for the electronic element 100 that is beneficial to the mechanical endurance thereof. In addition, embedding it within the structure of the mechanical casing gives it good protection against mechanical attacks coming from outside the tyre.

The second radiofrequency transponder 100*bis*, having been encapsulated beforehand in an electrically insulating encapsulating rubber compatible with or similar to the material of the sidewall 83, is positioned on the outer face of the sidewall. The material similarity between the sidewall 83 and the encapsulating rubber ensures that the radiofrequency transponder 100*bis* is installed inside and at the periphery of the sidewall 83 during the curing process. The RFID tag 100*bis* is simply placed on the uncured outer face on the sidewall 83 during the production of the tyre casing. Pressurizing the green body in the curing mould ensures the positioning of the RFID tag 100*bis* in the cured state, as shown. This RFID transponder 100*bis* is situated far from any free edge of a rubber component of the tyre casing. In particular, it is spaced from the free edge 932 of the protective bead, from the free edge 881 of the carcass ply and from the free edges 911 and 922 of the filler rubbers. Its position at the upper part of the bead ensures improved communication performance with an external radiofrequency reader.

The invention claimed is:

1. A transport means equipped with at least one movable assembly capable of ensuring relative movement of the transport means with respect to another mechanical system, the at least one movable assembly consisting of a deformable part set in motion about at least one axis of rotation by a non-deformable assembly, free movement of the at least one movable assembly taking place in a predominantly two-dimensional plane in a reference frame associated with the at least one movable assembly, the deformable part of the at least one movable assembly defining a median plane which is perpendicular to the at least one axis of rotation, the at least one movable assembly being equipped with a radiofrequency transponder comprising a radiofrequency transponder reading system, the radiofrequency transponder reading system comprising:

a generator of electrical signals emitting at a frequency F0 included in an ultra-high frequency band, coupled to a demodulator of electrical signals adapted to a frequency band around F0, mounted on the transport means; and at least one bidirectional communication cable comprising a conductive core covered with a dielectric material, the dielectric material being covered with a conductive assembly, being partly flexible, having one end galvanically connected to the generator of electrical signals, the length lo of which is divided according to a metric of which a unit is a wavelength defined by the frequency F0, the at least one bidirectional communication cable being fixed to the transport means externally of the at least one movable assembly, comprising a radiating part, wherein a curvilinear abscissa of a first continuous part of the radiating part of the at least one bidirectional communication cable is at least greater than one unit of cable length, wherein a distance of an orthogonal projection P of the first continuous part of the radiating part of the at least one bidirectional communication cable on a plane of the deformable part located between two contiguous axes of rotation and collinear with the two contiguous axes of rotation and/or a distance of a radial projection R of the first continuous part of the radiating part of the at least one bidirectional communication cable on a cylinder, of axis of revolution coaxial with the at least one axis of rotation of the non-deformable assembly, circumscribing the deformable part in contact with the non-deformable assembly, is less than or equal to 1 meter, and wherein a distance of an axial projection A, in a direction of the at least one axis of rotation, of the first continuous part of the radiating part of the at least one bidirectional communication cable on the median plane of the deformable part of the at least one movable assembly is less than or equal to 2 meters.

2. The transport means according to claim 1, wherein the radiating part of the at least one bidirectional communication cable comprises at least one second continuous part disjointed from the first continuous part, a curvilinear abscissa of the at least one second continuous part is at least greater than one unit of cable length, a distance of an orthogonal projection P of the at least one second continuous part of the radiating part of the at least one bidirectional communication cable on a plane of the deformable part of a second movable assembly located between two contiguous axes of rotation and collinear with the two contiguous axes of rotation and/or a distance of a radial projection R of the at least one second continuous part of the radiating part of the at least one bidirectional communication cable on a cylinder, of axis of revolution coaxial with the at least one axis of rotation of the non-deformable assembly of the second movable assembly, circumscribing the deformable part in contact with the non-deformable assembly of the second movable assembly, is less than or equal to 1 meter, and a distance of an axial projection A, in the direction of the at least one axis of rotation of the second movable assembly, of the at least one second continuous part of the radiating part of the at least one bidirectional communication cable on the median plane of the deformable part of the second movable assembly is less than 2 meters.

3. The transport means according to claim 1, wherein the at least one bidirectional communication cable is equipped at its free end with a conductor connected to the conductive core and covered with a second dielectric material, the second dielectric material partly covered by the conductor assembly of which the conductor length is adapted to a frequency band of the radiofrequency transponder reading system for capacitive coupling performance.

4. The transport means according to claim 3, wherein, in the radiating part of the at least one bidirectional communication cable, the conductor assembly is covered by a second conductor assembly which is connected to ground.

5. The transport means according to claim 2, wherein, a radiofrequency antenna of the radiofrequency transponder comprising at least one wire strand defining a first longitudinal axis, and the first and/or the at least one second continuous part of the radiating part of the at least one bidirectional communication cable defining a median line, an angle formed by director vectors of the first longitudinal axis and the median line is less than 30 degrees over at least part of a closed path described by the at least one movable assembly.

6. The transport means according to claim 5, wherein the radiofrequency transponder is an RFID tag.

7. The transport means according to claim 1, wherein the transport means is included in a group comprising a tracked land vehicle, a land vehicle with deformable and elastic tires, and a conveyor belt.

8. The transport means according to claim 1, wherein the deformable part of the at least one movable assembly is included in a group comprising a deformable and elastic tire, an elastomer mix conveyor belt and an elastomer mix caterpillar track.

9. The transport means according to claim 2, wherein the at least one movable assembly describes a rotational movement about a single axis of rotation, and a continuous part of the at least one bidirectional communication cable describes an angular sector about the single axis of rotation at least greater than 30 degrees.

10. The transport means according to claim 9, wherein the continuous part of the radiating part of the at least one bidirectional communication cable is fixed to at least one wall delimiting a cavity of the transport means receiving the at least one movable assembly.

11. The transport means according to claim 9, wherein the first and/or the second continuous part of the radiating part of the at least one bidirectional communication cable extends at a constant radial distance from the single axis of rotation of the at least one movable assembly.

12. The transport means according to claim 1, wherein the radiofrequency transponder transmits at a sub-carrier frequency.

13. The transport means according to claim 12, wherein the sub-carrier frequency of the radiofrequency transponder comprises a number of transitions of less than 5 over a unit period of the sub-carrier frequency.

14. The transport means according to claim 12, wherein the sub-carrier frequency of the radiofrequency transponder has a unit period of less than 10 µs.

* * * * *